G. K. GILLETTE.
POULTRY FEEDER.
APPLICATION FILED MAR. 25, 1915.
1,180,640.
Patented Apr. 25, 1916.
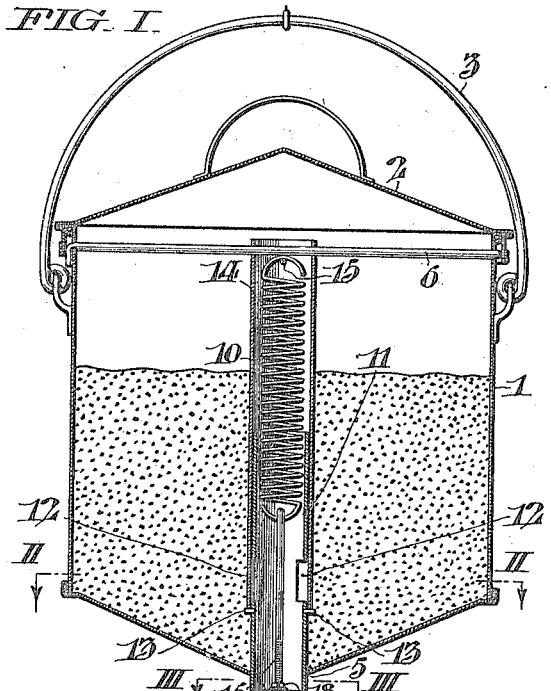
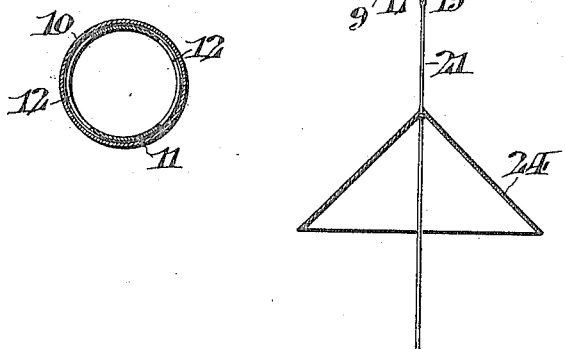
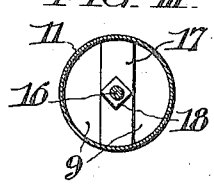
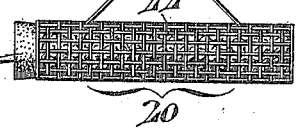
Inventor
George K. Gillette,
Attorneys

UNITED STATES PATENT OFFICE.

GEORGE K. GILLETTE, OF PEMBROKE, MASSACHUSETTS, ASSIGNOR TO WATSON MANUFACTURING COMPANY, OF LANCASTER, PENNSYLVANIA, A CORPORATION OF DELAWARE.

POULTRY-FEEDER.

1,180,640.   Specification of Letters Patent.   Patented Apr. 25, 1916.

Application filed March 25, 1915. Serial No. 16,879.

*To all whom it may concern:*

Be it known that I, GEORGE K. GILLETTE, of Pembroke, in the county of Plymouth and State of Massachusetts, have invented certain new and useful Improvements in Poultry-Feeders, whereof the following is a specification, reference being had to the accompanying drawings.

The invention relates to an improved poultry feeder and exerciser of the type operated by a bait bar.

The object of my invention is to provide a feeder which is simple, efficient and inexpensive; capable of operation by a downward blow on the bait bar and adapted to scatter feed over a comparatively large area.

A further object of my invention is to provide a feeder which can easily be adjusted to feed any kind of grain, in any quantity for any sized chicken, and also to prevent the feed from being scattered or injured by wind, rain, birds or vermin. Hitherto feeders of this type have usually relied upon rotation of the bait bar to effect release of the food. But I have noted only 20% of any flock will operate such a feeder, the tendency of most poultry being to peck downward rather than sidewise.

Attempts have been made to cause release of the food to depend upon the weight of the bird mounting a perch or platform in the effort to reach a bait. This necessitates limiting the charge of food released and is otherwise objectionable. I therefore provide a bait bar arranged in a horizontal position so that a downward blow or peck on it will operate a valve, and release the food.

The feeder consists of a hopper, and a valve which works in a vertical direction, which allows the grain to fall when the valve is pulled down. A deflector suspended from the same means as the bait bar spreads the grain as it falls, requiring the hens to hunt for it, thereby insuring the proper amount of exercise.

The hopper is made rain-proof by a tight fitting lid, and since the valve is so set that in its normal position it closes the discharge opening, no grain can be released or injured by wind or storm.

In the accompanying drawings, Figure I. represents a vertical section of a preferred form of my feeder and exerciser. Figs. II and III, are detail sectional views taken respectively in lines II—II and III—III, in Fig. I.

The hopper 1, is provided with a tight fitting lid 2, and a bail 3, by which the feeder may be suspended from any convenient support, thus doing away with the necessity of legs or supports from below. The lower part 4, of the hopper is conical in shape and truncated to provide an opening 5.

Across the top of the hopper is placed the bar 6, which supports the tube or sleeve 10, in a vertical position directly above the opening 5. Tube 11, is arranged to reciprocate in the lower portion of the tube 10, and through the opening 5. This tube is provided with ports 12, and acts as a valve for controlling the flow of the grain through the opening 5. It is obvious that when the tube is in its upper position, as shown in the drawings, so that the ports 12 are within the tube 10, no grain can escape. When, however, the ports 12, are brought below the lower extremity of the tube 10, they will provide an outlet for anything within the hopper through the opening 9, at the lower end of the tube 11. In order to limit the reciprocation of this tube, lugs 13, are provided, so arranged that when the tube 11, is in the uppermost position, the ports 12, will be completely closed and yet there will be sufficient of the tube projecting below the end of the tube 10, to close the opening 5, and that when tube 11, is in its lowest position, ports 12, are completely open. The action of this valve is further controlled by the helical spring 14, which is attached at its upper end to the tube 10, by means of the cross pin 15, and at its lower end to tube 11, by means of the vertical bar 16, and cross arm 17. Normally, this spring will hold the tube 11, in its uppermost position, which is the closed position. When, however, the spring is expanded, by the exertion of any downward force on the bar 16, tube 11, will be depressed and the ports 12, will open. The extent of opening will be in direct proportion to the amount of downward force exerted, until the ports 12, are entirely uncovered, and then further depression of the tube 11, is checked by the operation of the lugs 13.

It is obvious that by increasing the tension of the spring 14, the amount of depression of the tube 11, and consequently the extent to which the port 12, is uncovered by any given force may be decreased. Nuts 18, and 19, are therefore threaded on the bar 16, on either side of the cross arm 17, and on their position will depend the tension of the spring, so that by merely regulating these nuts, the size of the opening may be regulated.

From the lower end of the bar 16, the bait bar 20, is suspended in such a manner as to present a horizontal baited surface. The bar may be suspended by a wire or bar 21, or any other suitable means. This bait bar is of the ordinary sort and consists simply of a tube of wire netting 22, closed at one end, and provided with a cork 23, or other suitable closure at the other.

From the wire 21, is suspended the deflector 24, which is conical in shape and hangs directly under the discharge opening 9. In this position, it serves to deflect the falling grain and spreads it over a considerable area. When the grain is so scattered, the hens have to hunt for it, and are thereby provided with the exercise necessary for keeping them in the best condition for egg laying. By varying the distance between the deflector and the discharge opening, the size of the area over which the grain is deflected may be enlarged or decreased.

In operation, the tension of the spring 14, is adjusted to give the proper size opening for the variety of grain used, when a downward force, equivalent to the peck of the average bird in the flock, is exerted in the bait bar. Grain is then placed in the hopper 1, and in the bait bar 20. The feeder is then hung in a proper position with the bait bar hanging just above the ground, so that the hens can easily peck down upon it. The hens then in pecking at the corn in the bait bar will exert a downward force upon it, which being communicated to the tube 11, by the wire 21, will open the ports 12, and allow some of the grain to pass through the lower end 9, of the tube 11, and fall to the ground. The grain in falling strikes the deflector, and is scattered as has been explained. However, as soon as the force exerted on the bait bar is released, the tube will spring back to its normal position, and prevent any more grain from falling out until a new downward force is exerted on the bait bar. As has been explained, the fact that the valve is self closing is particularly desirable, as it prevents grain from being spilled by wind or storm or other accidental jarring of the hopper, and also the feeder may be closed against the birds by simply placing the bait bar on top of the hopper.

I do not claim to have invented either the hopper or the bait bar or the deflector, all of which are old, but I believe that a hopper with a valve operated directly by downward pressure on a bait bar, without the interposition of any treadle, or levers, is novel.

Having thus described my invention, I claim:

1. In a poultry feeder, the combination of a hopper; a vertically reciprocating valve controlling the hopper; a member suspended beneath said hopper presenting a horizontal baited surface and means whereby downward pressure on said baited surface depresses and operates the valve.

2. In a poultry feeder, the combination of a hopper, a discharge opening at the bottom thereof; a valve controlling said opening; a bait bar attached to said valve and presenting a horizontal surface; and means for keeping the valve closed except when downward pressure is exerted on said bait bar.

3. A poultry feeder comprising a hopper having a discharge opening at the bottom; a valve controlling said opening; a bait bar suspended therefrom in a horizontal position; a spring controlling said valve, whereby the opening remains closed in its normal position but is opened while a downward force is exerted on said bait bar.

4. A poultry feeder comprising a hopper having a discharge opening at the bottom; a tube open at its lower end reciprocating in said opening; a port in said tube opening to the hopper; means whereby said port is closed when said tube is in its upper position and open when said tube is in its lower position; a bait bar suspended from said tube.

5. A poultry feeder comprising a hopper having a discharge opening at the bottom; a sleeve in vertical position above the opening; a tube open at its lower end reciprocating in the lower portion of said sleeve and through the opening of the hopper; a port in said tube which is covered by the sleeve when in its upper position and not covered when the tube is depressed, permitting the contents to flow from the hopper and down through the tube; a bait bar suspended directly from said tube, and a spring normally holding the tube in its upper position in the sleeve.

In testimony whereof, I have hereunto signed my name at Pembroke, Massachusetts, this twenty-second day of March, 1915.

GEORGE K. GILLETTE.

Witnesses:
JULIUS R. SHEPHERD,
WILLIAM J. DELAP.

Copies of this patent may be obtained for five cents each, by addressing the "Commissioner of Patents, Washington, D. C."